US012792702B2

(12) United States Patent
Nagai et al.

(10) Patent No.: US 12,792,702 B2
(45) Date of Patent: Nov. 10, 2026

(54) VEHICLE SECURITY APPARATUS, SECURITY METHOD, AND RECORDING MEDIUM

(71) Applicant: Panasonic Automotive Systems Co., Ltd., Kanagawa (JP)

(72) Inventors: Takumaru Nagai, Osaka (JP); Jun Anzai, Kanagawa (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 253 days.

(21) Appl. No.: 18/762,192

(22) Filed: Jul. 2, 2024

(65) Prior Publication Data

US 2025/0083641 A1 Mar. 13, 2025

(30) Foreign Application Priority Data

Sep. 11, 2023 (JP) ................................ 2023-146722

(51) Int. Cl.
*G06F 21/30* (2013.01)
*G06F 21/44* (2013.01)

(52) U.S. Cl.
CPC .............. *G06F 21/30* (2013.01); *G06F 21/44* (2013.01)

(58) Field of Classification Search
None
See application file for complete search history.

(56) References Cited

U.S. PATENT DOCUMENTS

2013/0219170 A1* 8/2013 Naitou ................ H04L 12/6418 713/153
2019/0207950 A1* 7/2019 Mohammed .......... G06F 21/606
2020/0050442 A1* 2/2020 Sakurai ................... H04W 4/48
2023/0376575 A1 11/2023 Anzai et al.

FOREIGN PATENT DOCUMENTS

CN 106458112 A * 2/2017 ........... B60R 16/023
CN 111177691 A * 5/2020 ............. G06F 21/44
DE 102018203966 A1 * 10/2018 .............. H04W 4/48
JP 2022-162461 10/2022
WO 2022/172578 8/2022
WO 2022/244179 11/2022
WO 2022/264411 12/2022

* cited by examiner

*Primary Examiner* — Benjamin E Lanier
(74) *Attorney, Agent, or Firm* — Greenblum & Bernstein, P.L.C.

(57) ABSTRACT

A vehicle security apparatus includes a primary dynamic authenticator and a connection manager that are provided in an ECU included in a vehicle, wherein when an access request from an access source in the vehicle to an access destination in the vehicle is received, the primary dynamic authenticator determines, based on reliability of an application installed in the access source determined based on at least one of a state of the application of the access source or a state of the vehicle, whether to cause a secondary dynamic authenticator included in a zone ECU connected to the access destination of the access request to execute authorization determination for the access request, and when it is determined to cause the secondary dynamic authenticator that corresponds to the access destination to execute the authorization determination, the connection manager outputs the access request to the zone ECU connected to the access destination.

19 Claims, 7 Drawing Sheets

VEHICLE SECURITY APPARATUS, SECURITY METHOD, AND RECORDING MEDIUM

CROSS REFERENCE TO RELATED APPLICATION

The present application is based on and claims priority of Japanese Patent Application No. 2023-146722 filed on Sep. 11, 2023.

FIELD

The present disclosure relates to a vehicle security apparatus mounted in a vehicle, a security method, and a recording medium.

BACKGROUND

In the field of information technology (IT) system, perimeter security in which security countermeasures are intensively performed on the boundary between an internal network and an external network has been mainly used. However, the limits of the perimeter security are pointed out, and the concept of zero trust security that is based on the idea that access sources should not be trusted by default is introduced. Also, studies have been conducted on an access request authorization system to which the concept of zero trust security is introduced. For example, Patent Literature (PTL) 1 discloses a dynamic access authorization system that implements dynamic authorization for an access request for access to a resource.

CITATION LIST

Patent Literature

PTL 1: Japanese Unexamined Patent Application Publication No. 2022-162461

SUMMARY

However, the vehicle security apparatus can be improved upon.

In view of this, the present disclosure provides a vehicle security apparatus, a security method, and a recording medium capable of improving upon the above related art.

A vehicle security apparatus according to an aspect of the present disclosure is a vehicle security apparatus mounted in a vehicle, the vehicle including: an electronic control unit (ECU) in which the vehicle security apparatus is provided; and a zone ECU that is controlled by the ECU and controls a device mounted in the vehicle, the vehicle security apparatus including: a primary dynamic authenticator that, when an access request from an access source in the vehicle to an access destination in the vehicle is received, makes a determination as to whether to cause a secondary dynamic authenticator included in the zone ECU connected to the access destination of the access request to execute authorization determination for the access request, based on reliability of an application installed in the access source determined based on at least one of application information regarding the application installed in the access source or a state of the vehicle; and a connection manager that outputs the access request to the zone ECU connected to the access destination when the determination is made to cause the secondary dynamic authenticator that corresponds to the access destination to execute the authorization determination.

A security method according to an aspect of the present disclosure is a security method executed by a vehicle security apparatus mounted in a vehicle, the vehicle including: an electronic control unit (ECU) in which the vehicle security apparatus is provided; and a zone ECU that is controlled by the ECU and controls a device mounted in the vehicle, the security method including: when an access request from an access source in the vehicle to an access destination in the vehicle is received, making a determination as to whether to cause a secondary dynamic authenticator included in the zone ECU connected to the access destination of the access request to execute authorization determination for the access request, based on reliability of an application installed in the access source determined based on at least one of application information regarding the application installed in the access source or a state of the vehicle; and outputting the access request to the zone ECU connected to the access destination when the determination is made to cause the secondary dynamic authenticator that corresponds to the access destination to execute the authorization determination.

A recording medium according to an aspect of the present disclosure is a non-transitory computer-readable recording medium having recorded thereon a program for causing a computer to execute the above-described security method.

According to any of the aspects of the present disclosure, it is possible to implement a vehicle security apparatus and the like capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT (Circumstances Leading to the Present Disclosure)

In recent years, along with widespread use of electric vehicles and the like, security risk in the vehicles is increasing, and thus studies have been conducted on introduction of so-called zero trust architecture (ZTA). However, if ZTA is applied directly to a vehicle, authorization determination processing is concentrated on the central ECU, which may raise concerns in terms of real-time performance and load while the vehicle is running. Also, there is demand for a vehicle in which ZTA is introduced while suppressing the reduction in security.

In view of the above, the present disclosure provides, as a further improvement, a vehicle security apparatus, a security method, and a recording medium in which the zero trust architecture can be introduced while suppressing the processing concentration and the reduction in security.

Hereinafter, an embodiment will be described specifically with reference to the drawings.

The embodiments described below show generic or specific examples of the present disclosure. The numerical values, shapes, materials, structural elements, the arrangement and connection of the structural elements, and the like shown in the following embodiment are merely examples, and therefore are not intended to limit the scope of the present disclosure.

Embodiment

Hereinafter, a vehicle security apparatus according to an embodiment will be described.

[1. Configuration of Vehicle Security System]

Figure 1:
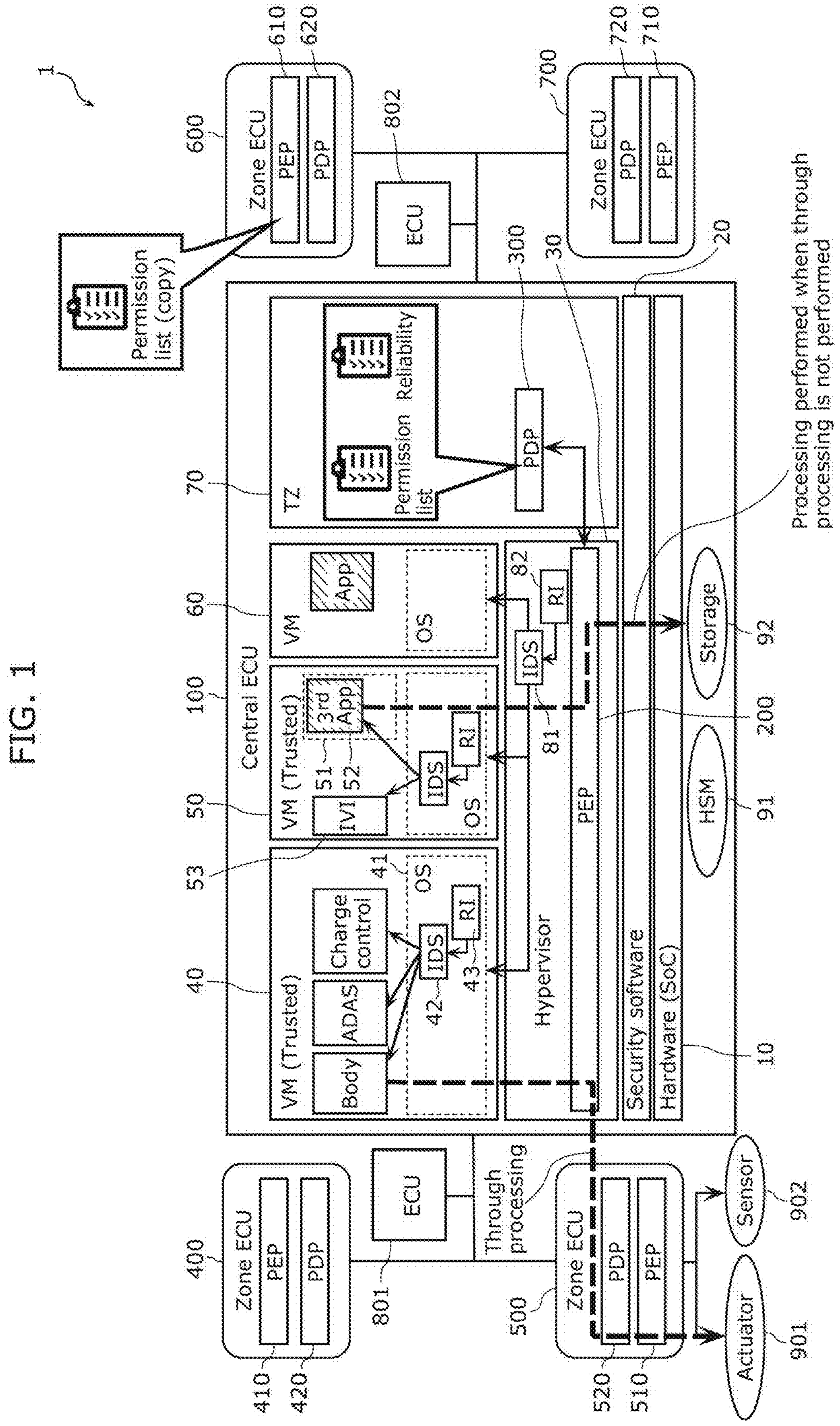
FIG. 1 is a block diagram showing an example of a vehicle security system according to an embodiment.

FIG. 1 is a block diagram showing an example of vehicle security system 1 according to an embodiment of the present disclosure. Vehicle security system 1 is mounted in a vehicle (an example of a mobile body). For example, it is sufficient that vehicle security system 1 includes a primary dynamic authenticator and a connection manager, and also includes one or more secondary dynamic authenticators and one or more connection managers. Central electronic control unit (ECU) 100, zone ECUs 400, 500, 600, and 700, actuator 901, and sensor 902 that are provided in the vehicle do not necessarily need to be the structural elements of vehicle security system 1.

Vehicle security system 1 is a system for applying the zero trust architecture to a vehicle. The zero trust architecture is, for example, special publication (SP) 800-207 zero trust architecture specified by the National Institute of Standards and Technology (NIST). When the zero trust architecture is applied to a vehicle, authentication is performed dynamically for each of various resources of the vehicle (for each access request). In order to dynamically authenticate an access request, vehicle security system 1 includes: primary dynamic authenticator 300 and connection manager 200 that are provided in central ECU 100; and one or more secondary dynamic authenticators (secondary dynamic authenticators 420, 520, 620, and 720) and one or more connection managers (connection managers 410, 510, 610, and 710) that are provided in zone ECUs 400, 500, 600, and 700. Primary dynamic authenticator 300 and secondary dynamic authenticators 420, 520, 620, and 720 are examples of policy decision points (PDPs) in the zero trust architecture, and connection manager 200 and connection managers 410, 510, 610, and 710 are examples of policy enforcement points (PEPs) in the zero trust architecture.

As described above, in vehicle security system 1, PDPs and PEPs are provided in a distributed manner. Hereinafter, the secondary dynamic authenticator provided in each zone ECU will also be referred to as "edge PDP, and the connection manager provided in each zone ECU will also be referred to as "edge PEP". Also, the term "access request" encompasses a request for using a predetermined service, an access control request for controlling a predetermined resource, and the like.

FIG. 1 shows central ECU 100, zone ECUs 400, 500, 600, and 700 that are connected to central ECU 100, actuator 901, and sensor 902 that are provided in the vehicle, actuator 901 and sensor 902 being connected to zone ECU 500. That is, the vehicle includes an ECU (central ECU 100), and also includes zone ECUs 400, 500, 600, and 700.

Central ECU 100 is an ECU that performs overall control on the vehicle mainly with zone ECUs 400, 500, 600, and 700. Central ECU 100 is an example of a vehicle security apparatus mounted in a vehicle. Central ECU 100 is a main ECU in which a plurality of ECUs are integrated. Central ECU 100 is an ECU in which, in order to overcome problems such as an increase in development period and cost along with an increase in complexity of the in-vehicle system, the functions separately allocated to a plurality of ECUs in the conventional technology are integrated, and a virtualization technique is used to cause one ECU to operate a plurality of virtual computers (virtual machines: VMs).

Central ECU 100 includes primary dynamic authenticator 300 and connection manager 200. Central ECU 100 is an example of an ECU in which primary dynamic authenticator 300 and connection manager 200 are provided. Also, central ECU 100 further includes: hardware 10; security software 20; hypervisor 30; virtual machines 40, 50, and 60; trust zone 70 (indicated by TZ in FIG. 1) that is a secure execution environment; and hardware security module (HSM) 91 and storage 92 that are examples of resource 90 (see FIG. 2) of central ECU 100. Central ECU 100 is a computer that includes a processor (microprocessor), a memory, and the like. The memory includes a read only memory (ROM) and a random access memory (RAM), and the like, and can store a program that is executed by the processor.

In central ECU 100, security software 20, hypervisor 30, and trust zone 70 (Trust Zone (trademark): trusted region) run on a system-on-a-chip (hereinafter referred to simply as "SoC") that is hardware 10. On hypervisor 30, the plurality of virtual machines 40, 50, and 60 are activated, and different operating systems (hereinafter referred to simply as "OSes") run on virtual machines 40, 50, and 60, respectively. Primary dynamic authenticator 300 runs on trust zone 70. Hardware 10 represents a machine or a device that can receive data, perform a logic operation on data, store data, display data, and the like. The configuration is not limited thereto, and hardware 10 may include a processor and a memory.

Security software 20 is security software for implementing the trust zone. For example, a secure monitor may be used. However, security software 20 is not limited thereto.

Hypervisor 30 is virtualization infrastructure software for operating one or more virtual machines (the plurality of virtual machines in the example shown in FIG. 1). In the present embodiment, connection manager 200, anomaly detector 81 (intrusion detection system indicated by IDS in FIG. 1), and monitor 82 (runtime integrity indicated by RI in FIG. 1) run on hypervisor 30. Anomaly detector 81 detects an anomaly in each virtual machine (for example, in each application). Connection manager 200 will be described later in detail. Also, in the specification of the present application, an application or a process may also be referred to as "user".

Virtual machines 40, 50, and 60 can operate applications.

Virtual machine 40 includes OS 41 and one or more applications (indicated by body, ADAS (advanced driver assistance system), and charge control in FIG. 1). OS 41 manages execution of the one or more applications. OS 41 includes: anomaly detector 42 that detects an anomaly in each application; and monitor 43 that monitors whether anomaly detector 42 is in normal operation. Monitor 43 monitors whether anomaly detector 42 that is the monitor target is operating as expected (operation integrity) during operation of anomaly detector 42.

As described above, virtual machine 40 includes a body control function (application), an ADAS function (application), and a charge control function (application), but these functions (applications) are also implemented by a processor or the like that executes a program stored in the memory.

Virtual machine 40 is a virtual machine produced in-house by the manufacturer of the vehicle.

Virtual machine 50 includes an OS and one or more applications (IVI (in-vehicle infotainment) App 53 and 3rd App 52 shown in FIG. 1). The OS manages execution of the one or more applications. The OS includes an anomaly detector (indicated by IDS in FIG. 1) that detects an anomaly in each application and a monitor (indicated by RI in FIG. 1) that monitors whether the anomaly detector is in normal operation.

As described above, virtual machine 50 includes an IVI control function (application) and 3rd App 52 that runs on the 3rd party region in sandbox 51, but these functions (applications) are also implemented by a processor or the like that executes a program stored in the memory. Here, 3rd App 52 refers to an application program of a mobility service provider (also referred to as "3rd party application"). Also, sandbox 51 refers to a region for operating an application acquired from the outside of the vehicle.

Virtual machine 50 is a virtual machine produced in-house by the manufacturer of the vehicle.

Virtual machine 60 includes an OS and one or more application (indicated by App in FIG. 1). The OS manages execution of the one or more applications.

As described above, virtual machine 60 includes an IVI control function (application), but the function (application) is also implemented by a processor or the like that executes a program stored in the memory.

A certificate that includes a privilege level may be allocated to each application. The privilege level includes information that indicates the privilege of the application such as, for example, information indicating whether access can be made to functions related to the human life such as running, stopping, and turning, as well as information indicating that the information allows only reference thereto or the information is rewritable, and the like.

Primary dynamic authenticator 300 runs in a trusted execution environment (TEE) such as trust zone 70. The TEE runs independently of the ordinary OS included in each of virtual machines 40, 50, and 60. Primary dynamic authenticator 300 is implemented by a processor or the like that executes a program stored in the memory. Primary dynamic authenticator 300 will be described later in detail.

Zone ECUs 400, 500, 600, and 700 are provided in the vehicle, and control resources in the regions where they are provided. Each of zone ECUs 400, 500, 600, and 700 is connected to, for example, a device mounted in the vehicle, and controls the connected device. For example, zone ECU 500 controls actuator 901 and sensor 902. Also, zone ECUs 400, 500, 600, and 700 are integrally controlled by central ECU 100. The device includes at least one of a terminal accelerator, actuator 901, sensor 902, a motor, a battery, or a charger.

Each of zone ECUs 400, 500, 600, and 700 is a computer that includes a processor (microprocessor), a memory, and the like. The memory includes a ROM, a RAM, and the like, and can store a program that is executed by the processor. For example, the functions of zone ECUs 400, 500, 600, and 700 for controlling the resources (for example, actuator 901, sensor 902, the charger, and the like) connected to zone ECUs 400, 500, 600, and 700 are implemented by a processor or the like that executes a program stored in the memory.

At least one of the plurality of zone ECUs includes: a secondary dynamic authenticator that is an example of a PDP in the zero trust architecture; and a connection manager that is an example of a PEP in the zero trust architecture. In the present embodiment, zone ECU 400 includes secondary dynamic authenticator 420 and connection manager 410. Zone ECU 500 includes secondary dynamic authenticator 520 and connection manager 510, zone ECU 600 includes secondary dynamic authenticator 620 and connection manager 610, and zone ECU 700 includes secondary dynamic authenticator 720 and connection manager 710.

There is no particular limitation on the number of zone ECUs mounted in the vehicle as long as the number of zone ECUs mounted in the vehicle is one or more.

ECU 801 and ECU 802 are connected to communication paths between central ECU 100 and the zone ECUs.

Figure 2:
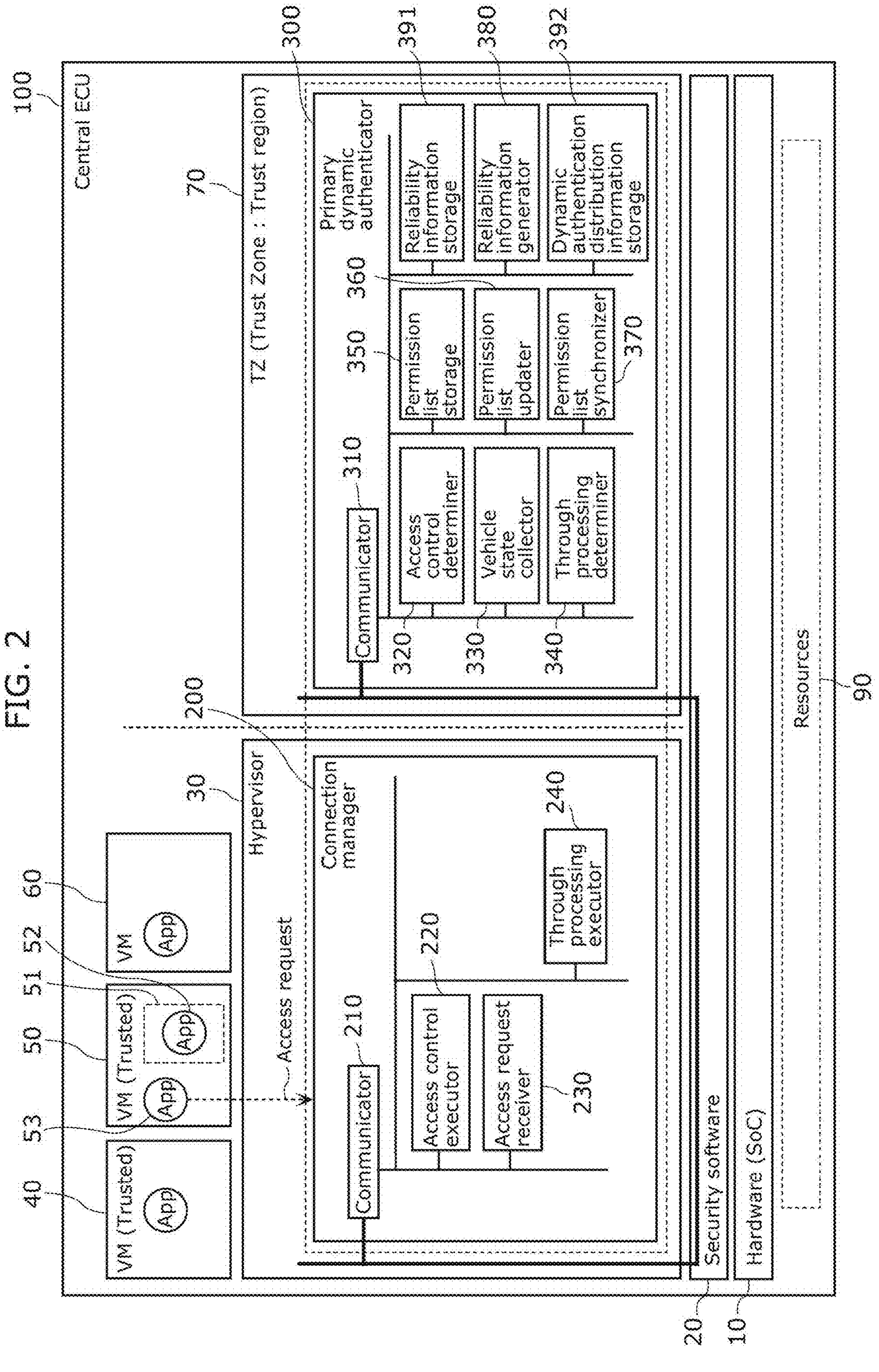
FIG. 2 is a block diagram showing a functional configuration of a central ECU according to the embodiment.

Here, detailed configurations of central ECU 100 and zone ECU 400 will now be described with reference to FIGS. 2 and 3. First, a detailed configuration of central ECU 100 will be described with reference to FIG. 2. FIG. 2 is a block diagram showing a functional configuration of central ECU 100 according to the present embodiment. In FIG. 2, each application is indicated by App.

As shown in FIG. 2, central ECU 100 includes primary dynamic authenticator 300 and connection manager 200 that are essential elements.

If it is determined by primary dynamic authenticator 300 to cause a secondary dynamic authenticator included in a zone ECU connected to a resource that is the access destination of an access request to execute authorization determination (authentication), connection manager 200 outputs the access request to the secondary dynamic authenticator that corresponds to the access destination to cause the secondary dynamic authenticator that corresponds to the access destination to execute authorization determination. Connection manager 200 includes communicator 210, access control executor 220, access request receiver 230, and through processing executor 240.

Communicator 210 performs communication with each structural element included in vehicle security system 1. Also, communicator 210 performs communication with primary dynamic authenticator 300. When communicator 210 receives an application request from an application, communicator 210 transmits an access determination request from access request receiver 230 to primary dynamic authenticator 300. Communicator 210 includes a communication module (communication circuit).

If it is determined by access control determiner 320 of primary dynamic authenticator 300 to execute the received access request, access control executor 220 performs control according to the access request.

Access request receiver 230 receives an access request from an application via communicator 210. In the example shown in FIG. 2, access request receiver 230 receives an access request from IVI App 53. When access request receiver 230 receives the access request, access request receiver 230 transmits an access determination request for the received access request to primary dynamic authenticator 300 via communicator 210, and receives a result of determination performed by primary dynamic authenticator 300 such as, for example, the result indicating to authorize access (permit access), deny access (not permit access), or perform through processing (cause secondary dynamic authenticator 420 to perform determination processing). The access determination request is a request for determining any one of authorizing access requested by the received access request, denying access requested by the received access request, or performing through processing, and includes, for example, information indicating the access source.

Through processing executor 240 executes through processing if through processing determiner 340 of primary dynamic authenticator 300 determines to execute through processing on the received access request. As used herein, the term "through processing" refers to processing for causing a zone ECU to perform authorization determination for the access request. For example, the through processing is processing for causing a zone ECU that controls the access destination of the access request to perform authorization determination for the access request without causing primary dynamic authenticator 300 to perform authorization determination for the access request. Specifically, through processing executor 240 transmits the access request for which authorization determination was not performed by primary dynamic authenticator 300 to the zone ECU that controls the access destination of the access request. For example, in the case where the access destination is actuator 901, through processing executor 240 transmits the access request transmitted from IVI App 53 to zone ECU 500 that controls actuator 901. Through processing executor 240 has the function of controlling a connection between an access source and an access destination, and thus connects IVI App 53 and zone ECU 500. As used herein, the term "controlling a connection" encompasses connecting and disconnecting.

In the case where connection manager 200 receives an access request (for example, access request shown in FIG. 2) from an access source in the vehicle to an access destination in the vehicle, primary dynamic authenticator 300 determines, based on reliability of an application installed in the access source, which of primary dynamic authenticator 300 or the secondary dynamic authenticator of the zone ECU that corresponds to the access destination is to perform authorization determination for the access request (specifically, processing of determining whether to permit the access request). If it is determined that primary dynamic authenticator 300 is to perform authorization determination for the access request, primary dynamic authenticator 300 dynamically performs authorization determination for the access request. If it is determined that the secondary dynamic authenticator is to perform authorization determination for the access request, primary dynamic authenticator 300 does not perform authorization determination for the access request. As described above, if it is determined that the secondary dynamic authenticator is to perform authorization determination for the access request, primary dynamic authenticator 300 does not perform authorization determination, and it is therefore possible to suppress a situation in which determination processing is concentrated on primary dynamic authenticator 300. Also, primary dynamic authenticator 300 may also acquire the reliability of the application installed in the access source based on the state of the vehicle. Calculation of the reliability will be described later.

Primary dynamic authenticator 300 includes communicator 310, access control determiner 320, vehicle state collector 330, through processing determiner 340, permission list storage 350, permission list updater 360, permission list synchronizer 370, reliability information generator 380, reliability information storage 391, and dynamic authentication distribution information storage 392.

Communicator 310 performs communication with connection manager 200. Communicator 310 includes a communication module (communication circuit).

If it is determined by through processing determiner 340 that primary dynamic authenticator 300 is to perform authorization determination for the access request, access control determiner 320 performs authorization determination for the access request. The authorization determination for the access request is carried out based on a permission list that includes the following item such as, in what type of vehicle state, access from which access source to which access destination is to be permitted. It can also be said that, in the permission list, if which condition is satisfied, access from which resource (access source) to which access destination is to be permitted is specified. In the permission list, it may also be specified that, in the case where the application is an undefined application, determination set by default is to be performed. The determination set by default may include, for example, complete prohibition (no access is permitted) or least privilege (only a minimum access is permitted). The permission list is also referred to as "policy".

Access control determiner 320 permits access to the access destination of the access request (the resource in the access destination) only when, for example, the state of the vehicle satisfies a condition specified in the permission list.

Access control determiner 320 may read a permission list that corresponds to the resource in the access destination of the access request from among a plurality of permission lists stored in permission list storage 350, and perform authorization determination for the access request.

Vehicle state collector 330 acquires vehicle state information that indicates the state of the vehicle via communicator 310. When vehicle state collector 330 acquires the vehicle state information as well, for example, authentication may be performed for an access request for access to a resource that stores the vehicle state information, and the vehicle state information may be acquired via connection manager 200.

For example, an access request made by a resource in the vehicle is permitted or prohibited according to the state of the vehicle, and thus whether or not to permit the access request is determined by taking the state of the vehicle into consideration. For this reason, the vehicle state information is collected by vehicle state collector 330. The state of the vehicle includes, for example, the usage of the access destination, the running state of the vehicle, the security condition of the access source, the security condition of the access destination, the usage of a service used in the vehicle, or the state of the access destination.

Through processing determiner 340 determines, based on the reliability of the access source, whether to perform through processing for the access request received by connection manager 200. Although details will be described later, through processing determiner 340 determines to perform through processing if the reliability is greater than or equal to a predetermined value, or in other words, the access source is trustworthy. To put it differently, authorization determination for an access request from a highly reliable access source is performed by the zone ECU, and not by central ECU 100.

Permission list storage 350 is a storage device that stores the permission list. The permission list may be stored for each resource. Permission list storage 350 is implemented by, for example, a hard disk drive (HDD), a semiconductor memory, or the like.

Permission list updater 360 updates the permission list stored in permission list storage 350 if a permission list update event is generated. The permission list update event may be, for example, acquiring a new permission list from the outside by over-the-air (OTA) or determining that a predetermined timing has arrived.

Permission list synchronizer 370 performs processing for synchronizing the content of the permission list stored in primary dynamic authenticator 300 with the content of the permission list stored in each zone ECU. Permission list synchronizer 370 copies the permission list stored in permission list storage 350 (for example, the latest permission list), and transmits a copy of the permission list to each zone ECU.

Reliability information generator 380 generates reliability information that includes the reliability based on at least one of application information or the state of the vehicle, and stores the generated reliability information in reliability information storage 391. Reliability information generator 380 sets the reliability for each application.

Reliability information generator 380 may generate the reliability of an application based on the location of the application (in which virtual machine the application is installed). Reliability information generator 380 may set the reliability to a different value based on, for example, whether the virtual machine is a virtual machine produced in-house or a virtual machine prepared externally. In the case where the virtual machine is a virtual machine produced in-house, reliability information generator 380 may set the reliability to be higher as compared with the case where the virtual machine is a virtual machine prepared externally. In the case where virtual machine 40 is a virtual machine produced in-house, and virtual machine 60 is a virtual machine prepared externally, reliability information generator 380 may set first reliability that is the reliability of the applications including body, ADAS, and charge control to be higher than second reliability that is the reliability of App (application) installed in virtual machine 60. Also, for an application installed in sandbox 51 of a virtual machine produced in-house, reliability information generator 380 may set the reliability to be equal to the second reliability, or to be higher than the second reliability and less than the first reliability. In FIG. 1, applications that have a low level of reliability are hatched.

Also, reliability information generator 380 may also set the reliability based on a certificate that includes a privilege level (permission level) acquired from the application installed in the access source. For example, the reliability may be set to a higher value as the privilege level for the functions related to the human life is higher. For example, for an application that can control the driving of the vehicle, the reliability may be set to a higher value than that of an application that allows reference to information stored in storage 92.

As described above, reliability information generator 380 may set the reliability of the application based on application information that can be acquired in advance such as the location of the application, the privilege level of the application, and the like.

Also, reliability information generator 380 may also set the reliability based on a result of detection performed by an anomaly detector mounted in the vehicle. If the anomaly detector detects an anomaly in the application or the location (for example, virtual machine) in which the application is installed, reliability information generator 380 may set the reliability of the application to be lower as compared with the case where the anomaly is not detected. It can also be said that, if an anomaly is detected in the application or the location in which the application is installed, reliability information generator 380 revokes the privilege of the application (lowers the privilege level of the application).

Also, reliability information generator 380 may also set the reliability based on a result of monitoring performed by a monitor (full validation result). If the monitor detects an anomaly in an anomaly detector that monitors the application, or an anomaly in an anomaly detector that monitors the location (for example, virtual machine) in which the application is installed, reliability information generator 380 may set the reliability of the application to be lower as compared with the case where the anomaly is not detected.

Here, an anomaly in the application, an anomaly in the location in which the application is installed, an anomaly in an anomaly detector that monitors the application, and an anomaly in an anomaly detector that monitors the location in which the application is installed are examples of the application information.

As described above, reliability information generator 380 may set the reliability of the application based on the state of the application that dynamically varies such as an anomaly related to the application. The reliability may be set based on whether there is an anomaly at the current time, whether there was an anomaly during a predetermined period of time in the past including the current time, or the number of times an anomaly was detected.

Also, reliability information generator 380 may also set the reliability of the application based on the state of the vehicle such as the running state of the vehicle, and the running location of the vehicle. When the running state of the vehicle is dangerous (for example, when the vehicle is running at a high speed), when the running location of the vehicle is dangerous (for example, when the vehicle is running on a highway), or the like, reliability information generator 380 may be set the reliability to be lower as compared with the case where it is not the case.

Reliability information generator 380 may calculate two or more reliability levels out of those described above, and perform an operation such as an averaging operation based on the calculated two or more reliability levels to obtain one reliability level.

Reliability information storage 391 is a storage device that stores the reliability information generated by reliability information generator 380. Reliability information storage 391 is implemented by, for example, a HDD, a semiconductor memory, or the like.

Dynamic authentication distribution information storage 392 stores, for each of the one or more zone ECUs mounted in the vehicle, dynamic authentication distribution information that indicates whether the zone ECU includes a secondary dynamic authenticator and a connection manager. Dynamic authentication distribution information storage 392 is implemented by, for example, a HDD, a semiconductor memory, or the like. The dynamic authentication distribution information is an example of authentication information.

Next, a detailed configuration of zone ECU 400 will be described with reference to FIG. 3. FIG. 3 a block diagram showing a functional configuration of zone ECU 400 according to the present embodiment. Zone ECUs 500, 600, and 700 have the same configuration as that of zone ECU 400, and thus a description thereof will be omitted.

Figure 3:
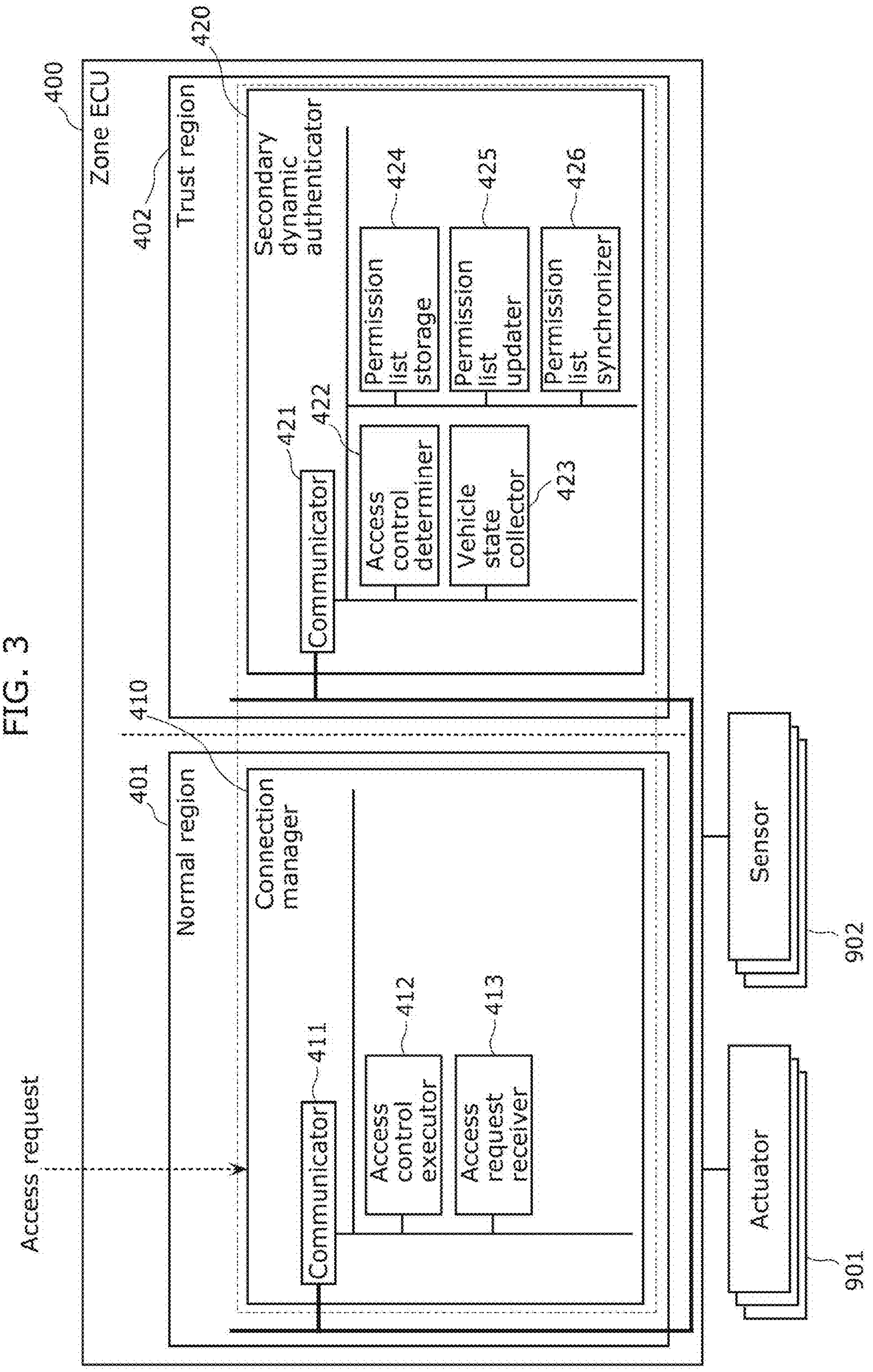
FIG. 3 is a block diagram showing a functional configuration of a zone ECU according to the embodiment.

As shown in FIG. 3, zone ECU 400 includes connection manager 410 and secondary dynamic authenticator 420 that are essential elements. As described above, in vehicle security system 1 according to the present embodiment, a dynamic authenticator (for example, secondary dynamic authenticator 420) is also provided in a zone ECU. Connection manager 410 may be provided in, for example, normal region 401 (non-secure region) in zone ECU 400, and secondary dynamic authenticator 420 may be provided in, for example, trusted region 402 (secure region) in zone ECU 400.

Connection manager 410 is provided on a communication path between an access source and an access destination (for example, between central ECU 100 and an access destination), and controls the connection between the access source and the access destination according to the determination made by secondary dynamic authenticator 420. Connection manager 410 controls (controls the connection between the access source and the access destination) whether to output an access request that has not undergone authorization determination (that has undergone through processing) and was transmitted from central ECU 100 to the access destination according to the determination made by secondary dynamic authenticator 420, or not output the access request to the access destination. If it is determined by secondary dynamic authenticator 420 that the access request is to be output (the access request is authorized), connection manager 410 outputs the access request to the resource of the access destination. If it is determined by secondary dynamic authenticator 420 that the access request is not to be output (the access request is not authorized), connection manager 410 does not output the access request to the resource of the access destination. Connection manager 410 includes communicator 411, access control executor 412, and access request receiver 413. Connection manager 410 includes constituent elements that are the same as those of connection manager 200 except for through processing executor 240.

Communicator 411 performs communication with central ECU 100 and secondary dynamic authenticator 420. Also, communicator 411 may be capable of performing communication with at least one of ECU 801 or ECU 802. In the case where communicator 411 is capable of performing communication with at least one of ECU 801 or ECU 802, communicator 411 acquires an access request from the at least one of ECU 801 or ECU 802 without passing through central ECU 100. Communicator 411 includes a communication module (communication circuit).

If it is determined by access control determiner 422 of secondary dynamic authenticator 420 to execute the received access request, access control executor 412 performs control according to the access request.

Access request receiver 413 receives an access request from each application via communicator 411.

When connection manager 410 receives an access request (for example, access request shown in FIG. 3) from an access source in the vehicle to an access destination in the vehicle, the access request having not undergone authorization determination in central ECU 100, secondary dynamic authenticator 420 dynamically performs authorization determination for the access request. It can also be said that secondary dynamic authenticator 420 dynamically performs authorization determination for an access request from a highly reliable access source. Secondary dynamic authenticator 420 includes communicator 421, access control determiner 422, vehicle state collector 423, permission list storage 424, permission list updater 425, and permission list synchronizer 426.

Communicator 421 performs communication with connection manager 410. Communicator 421 includes a communication module (communication circuit).

Access control determiner 422 performs authorization determination for the access request that has not undergone authorization determination performed by central ECU 100 (that has undergone through processing). The method for performing authorization determination for the access request is not limited to a particular method, and may be the same as that performed by access control determiner 320.

Vehicle state collector 423 acquires vehicle state information that indicates the state of the vehicle via communicator 421.

Permission list storage 424 is a storage device that stores a permission list. The permission list stored in permission list storage 424 is a permission list output from permission list synchronizer 370 (or in other words, output from central ECU 100), and is the same as the permission list stored in permission list storage 350. Permission list storage 424 is implemented by, for example, a HDD, a semiconductor memory, or the like.

Permission list updater 425 updates the permission list stored in permission list storage 424 when a permission list update event is generated.

Permission list synchronizer 426 performs processing to cause the permission list stored in secondary dynamic authenticator 420 to be the same as the permission list stored in primary dynamic authenticator 300. When a permission list update event is generated, permission list synchronizer 426 outputs a request for passing out the latest permission list to central ECU 100. Even when permission list synchronizer 426 makes the request for passing out the permission list, authentication may also be performed for the request for passing out the permission list to acquire the permission list via connection manager 410.

[2. Operation of Vehicle Security System]

Figure 4:
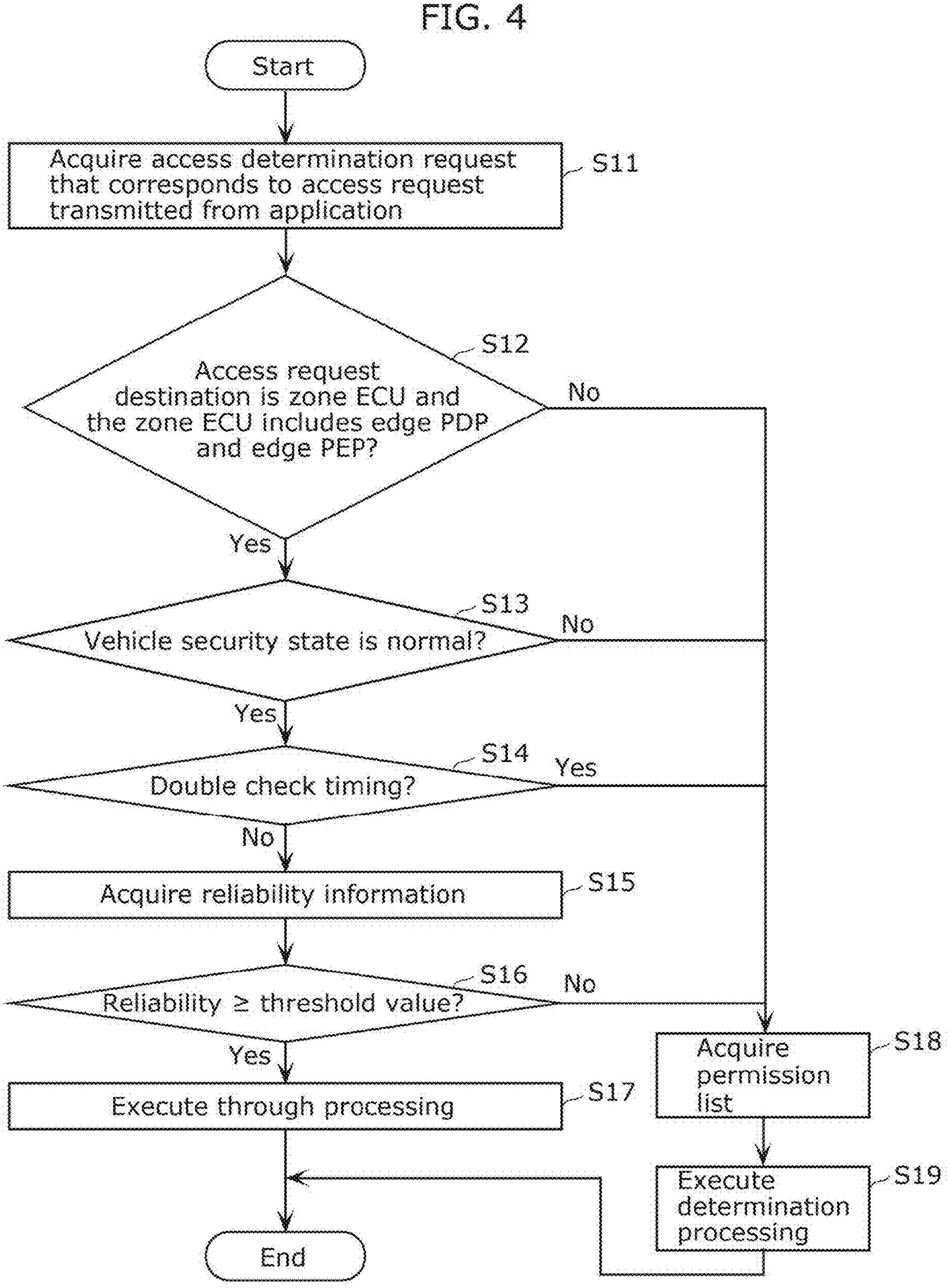
FIG. 4 is a flowchart illustrating a determining operation performed by the central ECU according to the embodiment.

Next, an operation performed by vehicle security system 1 configured as described above will be described with reference to FIGS. 4 to 7. FIG. 4 is a flowchart illustrating a determining operation (security method) performed by central ECU 100 according to the present embodiment.

As shown in FIG. 4, communicator 310 of primary dynamic authenticator 300 acquires, via communicator 210, an access determination request that corresponds to an access request transmitted from any one of the applications (users) and received by access request receiver 230 (S11).

Next, through processing determiner 340 determines whether the access request destination is a zone ECU, and the zone ECU includes an edge PDP and an edge PEP (S12). Through processing determiner 340 determines, based on the dynamic authentication distribution information acquired from dynamic authentication distribution information storage 392, whether the resource in the access destination of the access request is a resource in central ECU 100 or a zone ECU. If it is determined that the resource in the access destination of the access request is in a zone ECU, through processing determiner 340 further determines whether the zone ECU (target zone ECU) that controls the resource in the access destination includes a secondary dynamic authenticator and a connection manager (an edge PDP and an edge PEP). In the case where the dynamic authentication distribution information includes information that indicates that the target zone ECU includes a secondary dynamic authenticator and a connection manager, through processing determiner 340 determines that the target zone ECU includes a secondary dynamic authenticator and a connection manager. In the case where it is known that the target zone ECU includes a secondary dynamic authenticator and a connection manager (for example, in the case where all zone ECUs includes a secondary dynamic authenticator and a connection manager), the processing for determining whether the target zone ECU includes an edge PDP and an edge PEP in step S12 may be omitted. Also, in the case where whether the access request is an access request for access to a resource in central ECU 100 is determined, and if it is the case, the processing for determining whether the target zone ECU includes an edge PDP and an edge PEP in step S12 may be omitted. It can also be said that the access request for which yes is determined in step S12 is an access request for access to the zone ECU.

Next, if it is determined by through processing determiner 340 that the access request destination is a zone ECU, and the target zone ECU includes a secondary dynamic authenticator and a connection manager (Yes in S12), through processing determiner 340 further determines, based on the state of the vehicle acquired by vehicle state collector 330, whether the security state of the vehicle is normal (S13). When any one of the anomaly detectors mounted in the vehicle detects an anomaly, and when the vehicle is driving dangerously such as running at a high speed, through processing determiner 340 determines that the security state of the vehicle is not normal. To put it differently, when none of the anomaly detectors mounted in the vehicle detects an anomaly, and when the vehicle is running safely, through processing determiner 340 determines that the security state of the vehicle is normal.

Next, if it is determined by through processing determiner 340 that the security state of the vehicle is normal (Yes in S13), through processing determiner 340 further determines whether it is the double check timing (S14). As used herein, the term "double check" means to cause each of primary dynamic authenticator 300 and secondary dynamic authenticator 420 to perform authorization determination for the access request. For example, when a predetermined condition is satisfied such as when the access request is a request for the first access after updating the reliability or the permission list, when a predetermined length of time passes after the previous double check or the number of access requests acquired after the previous double check exceeds a predetermined value (an example of double check timing), or when a trigger (for example, an instruction to monitor the vehicle issued from a monitor center) is acquired from the outside of the vehicle, through processing determiner 340 determines that it is the double check timing. Also, the predetermined condition may also include at least one of: a condition in which an anomaly has been detected in the vehicle; a condition in which the vehicle is running at a high speed; or a condition in which it is determined by each of primary dynamic authenticator 300 and secondary dynamic authenticator 420 that it is the timing to execute authorization determination.

Next, if it is determined by through processing determiner 340 that it is not the double check timing (No in S14), through processing determiner 340 acquires the reliability information of the application installed in the access source from reliability information storage 391 (S15). The reliability information acquired here is a portion of information used in the determination processing executed in step S19, which will be described later.

Next, through processing determiner 340 determines whether the reliability included in the acquired reliability information is greater than or equal to a threshold value (S16). That is, through processing determiner 340 determines whether the reliability of the access source is high. In this way, in step S16, the determination is made by using a portion of information used in the processing executed in step S19 before the processing of step S19 is performed.

Next, if it is determined by through processing determiner 340 that the reliability of the application installed in the access source is greater than or equal to a threshold value (Yes in S16), through processing determiner 340 executes through processing (S17). Through processing executor 240 outputs the access request to the target zone ECU based on the result of determination made by through processing determiner 340. That is, through processing is executed only when the reliability of the application installed in the access source is high. Through processing determiner 340 may also output the access request for performing through processing to the target zone ECU after adding information indicating that through processing has been performed to the access request.

Also, if no is determined by through processing determiner 340 in steps S12, S13, and S16, and if yes is determined by through processing determiner 340 in step S14, it means that primary dynamic authenticator 300 performs authorization determination, and thus access control determiner 320 acquires the permission list required for the authorization determination by reading the permission list from permission list storage 350 (S18).

Next, access control determiner 320 executes determination processing for performing authorization determination for the access request based on the permission list (S19). If the authorization determination for the access request is performed appropriately by access control determiner 320 (if an authentication error is not issued), the processing for the access request is executed by access control executor 220.

Through the processing described above, determination processing is performed by the zone ECU only when the reliability is high, and it is therefore possible to distribute the processing load of authorization determination (or in other words, reduce the processing load on central ECU 100) while suppressing a reduction in security of vehicle security system 1.

The permission list is not used in the determination processing operations performed in steps S12, S13, S14, and S16.

If yes is determined in step S14, double check is performed for the access request. If yes is determined in step S14, access control determiner 320 may execute determination processing in step S19, and through processing executor 240 may output, to the target zone ECU, the access request to which information indicating that the access request needs to be subjected to double check is added. Also, the zone ECU that has acquired the access request to which information indicating that the access request needs to be subjected to double check is added may execute determination processing shown in FIG. 6, which will be described later, on the access request (S45), and output an execution result (authentication result) to primary dynamic authenticator 300. If the execution result of primary dynamic authenticator 300 matches the execution result of zone ECU, access control executor 220 may be caused to perform control according to the access request.

Figure 5:
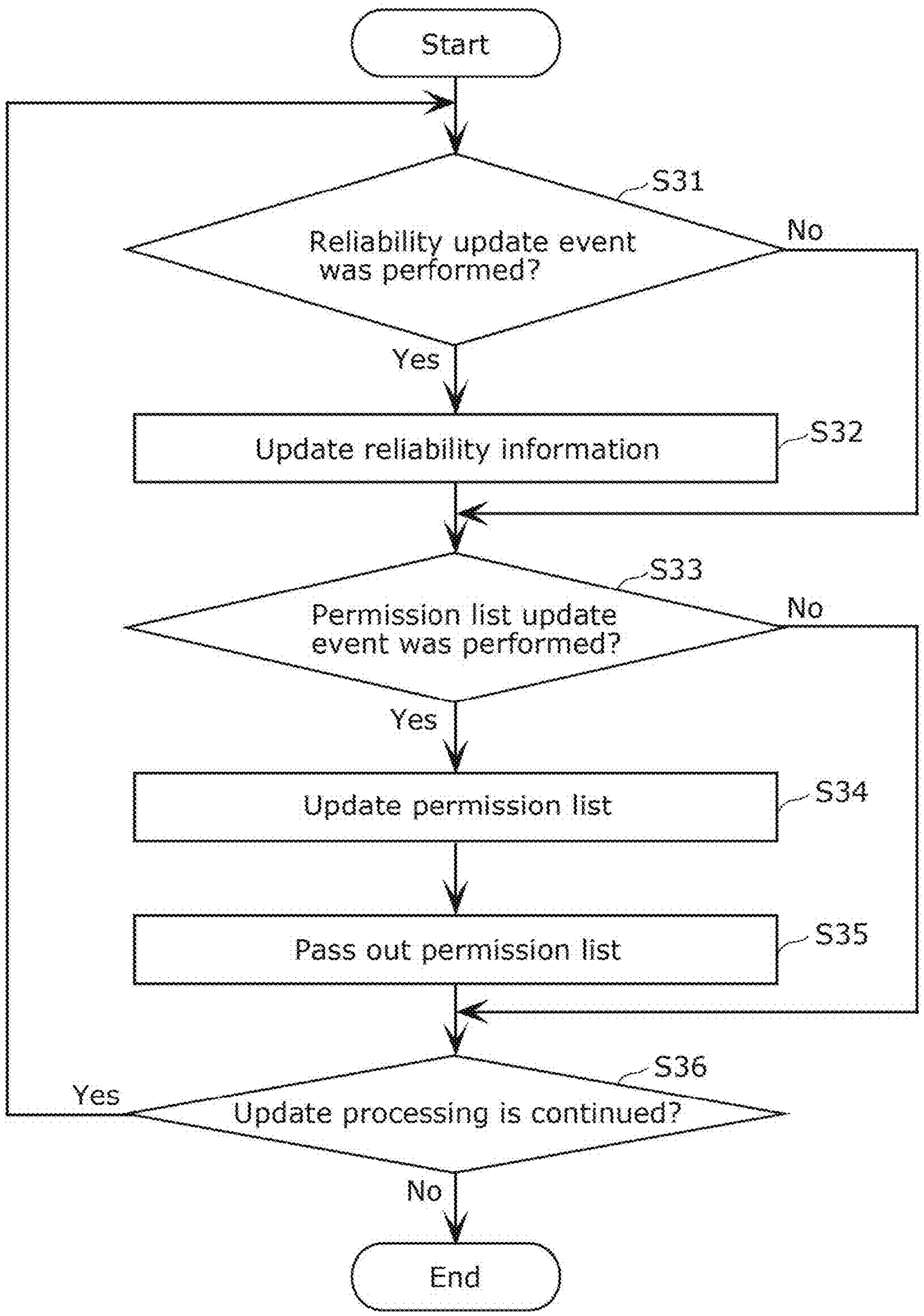
FIG. 5 is a flowchart illustrating an update operation for updating determination making information performed by the central ECU according to the embodiment.

Next, an update operation for updating determination making information performed by central ECU 100 will be described with reference to FIG. 5. FIG. 5 is a flowchart illustrating an update operation for updating determination making information (security method) performed by central ECU 100 according to the present embodiment.

As shown in FIG. 5, reliability information generator 380 of primary dynamic authenticator 300 determines whether a reliability update event was performed (S31). Here, the reliability update event includes at least one of: an event in which firmware is updated; an event in which new reliability is acquired from the outside by OTA; an event in which a new application is downloaded; an event in which an anomaly is detected by an anomaly detector; and an event in which a predetermined timing arrives.

Next, if it is determined by reliability information generator 380 that a reliability update event was performed (Yes in S31), the processing proceeds to step S32. If it is determined by reliability information generator 380 that a reliability update event was not performed (No in S31), the processing proceeds to step S33.

Next, if it is determined by reliability information generator 380 that a reliability update event was performed, reliability information generator 380 updates the reliability according to the reliability update event (S32).

Next, permission list updater 360 determines whether a permission list update event was performed (S33). The permission list update event used herein includes at least one of: an event in which primary dynamic authenticator 300 determines that the permission list needs to be updated; an event in which the zone ECU transmits a request for the latest permission list to central ECU 100; or an event in which a predetermined length of time passes after the previous update.

If it is determined by permission list updater 360 that a permission list update event was performed (Yes in S33), the processing proceeds to step S34. If it is determined by permission list updater 360 that a permission list update event was not performed (No in S33), the processing proceeds to step S36.

Next, if it is determined by permission list updater 360 that a permission list update event was performed, permission list updater 360 updates the permission list stored in permission list storage 350 according to the permission list update event (S34).

Next, permission list synchronizer 370 passes out the updated permission list (S35). Permission list synchronizer 370 copies the updated permission list, and outputs copies of the permission list to all zone ECUs via communicators 310 and 210. Through this processing, the permission lists stored in central ECU 100 and the permission lists stored in zone ECU can be made the same. That is, the content of the permission lists stored in central ECU 100 and the content of the permission lists stored in zone ECU can be synchronized.

Next, reliability information generator 380 determines whether to continue the update processing for updating at least one of reliability or the permission list (S36). If it is determined by reliability information generator 380 to continue the update processing (Yes in S36), the processing returns to step S31 and is continued. If it is determined by reliability information generator 380 not to continue the update processing (No in S36), the processing ends.

Here, the order in which the reliability update processing (S31 and S32) and the permission list update processing (S33 to S35) are performed is not limited to this order. Also, the reliability update processing and the permission list update processing may be performed at timings independent of each other.

Figure 6:
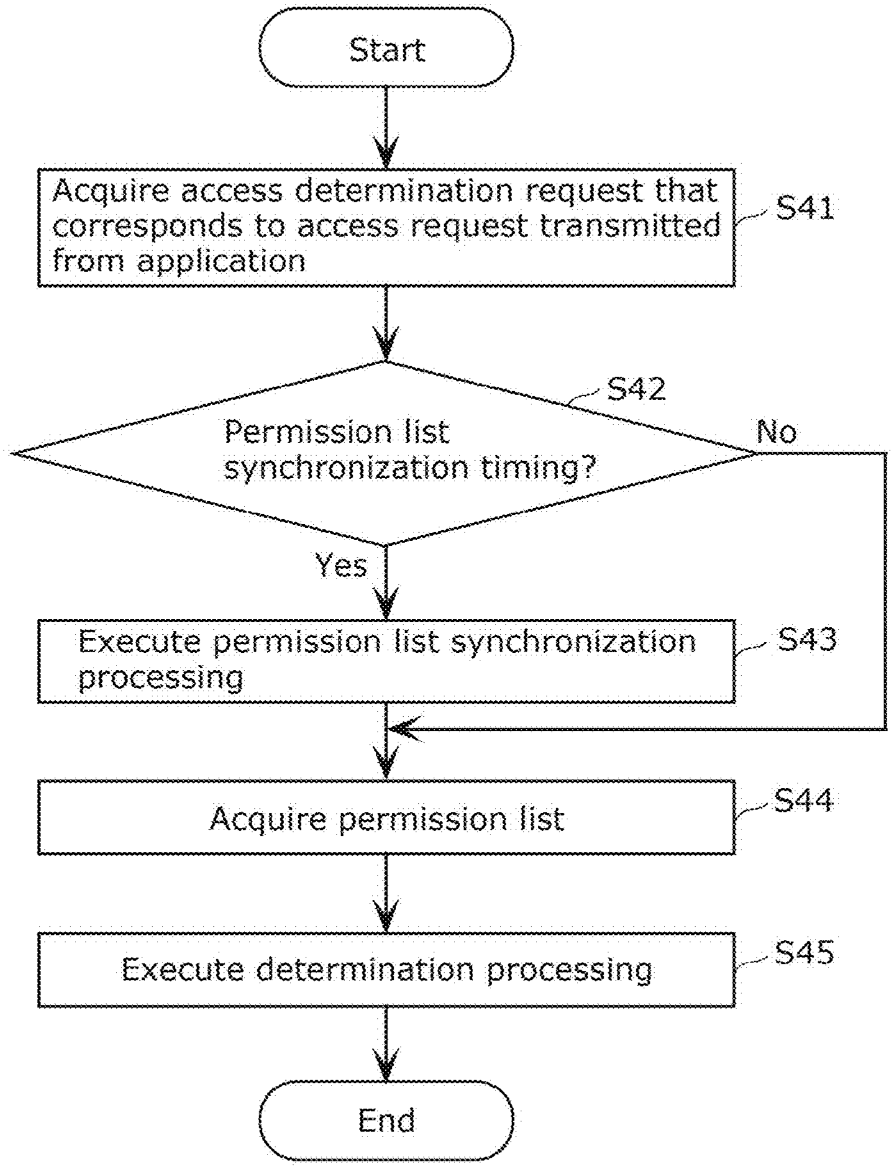
FIG. 6 is a flowchart illustrating a determining operation performed by the zone ECU according to the embodiment.

Next, the update operation for updating determination making information performed by the zone ECU will be described with reference to FIG. 6. FIG. 6 is a flowchart illustrating a determining operation (vehicle security method) performed by the zone ECU according to the present embodiment. Hereinafter, an example will be described in which the target zone ECU is zone ECU 400.

As shown in FIG. 6, communicator 421 of secondary dynamic authenticator 420 acquires, via communicator 411, an access determination request that corresponds to the access request output from central ECU 100 and received by access request receiver 413 (or in other words, an access determination request that corresponds to the access request from the application acquired in step S11) (S41). It is assumed here that the access request acquired in step S41 is an access request that has undergone through processing. Whether the access request acquired in step S41 is an access request that has undergone through processing can be determined based on whether the access request includes information indicating that the access request has undergone through processing.

Next, permission list synchronizer 426 determines whether it is the permission list synchronization timing (S42). Permission list synchronizer 426 determines that it is the permission list synchronization timing, for example, when the access request is a request for the first access after updating the reliability information or the permission list, when a predetermined length of time passes after the previous update or the number of access requests acquired after the previous update is greater than or equal to a predetermined value, or when a trigger (for example, an instruction to monitor the vehicle issued from a monitor center) is acquired from the outside of the vehicle.

Next, if it is determined that it is the permission list synchronization timing (Yes in S42), permission list synchronizer 426 executes permission list synchronization processing (S43). If it is determined that it is not the permission list synchronization timing (No in S42), the processing proceeds to step S44. The synchronization processing performed in step S43 includes processing of transmitting a request for passing out the latest permission list to central ECU 100 (processing for causing central ECU 100 to have the same permission list), performed by permission list synchronizer 426.

Next, permission list synchronizer 426 acquires the latest permission list from primary dynamic authenticator 300 via communicator 421 (S44). The acquired permission list is stored in permission list storage 424 by permission list updater 425. That is, the permission list stored in permission list storage 424 is updated to the latest permission list.

Next, access control determiner 422 executes determination processing for performing authorization determination for the access request based on the permission list (S45). The processing performed in step S45 is the same as that performed in step S19 shown in FIG. 4.

Figure 7:
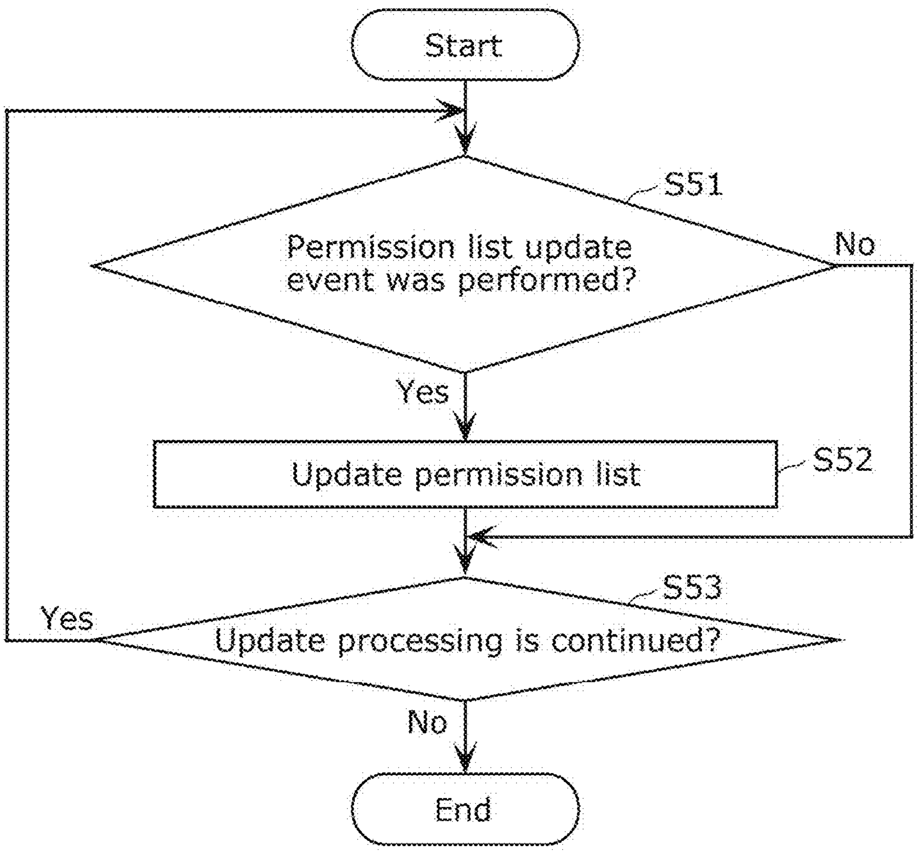
FIG. 7 is a flowchart illustrating an update operation for updating determination making information performed by the zone ECU according to the embodiment.

Next, an update operation for updating determination making information performed by the zone ECU will be described with reference to FIG. 7. FIG. 7 is a flowchart illustrating an update operation for updating determination making information (security method) performed by the zone ECU according to the present embodiment. Hereinafter, an example will be described in which the target zone ECU is zone ECU 400.

As shown in FIG. 7, permission list updater 425 of secondary dynamic authenticator 420 determines whether a permission list update event was performed (S51). The permission list update event used herein may include the following: for example, central ECU 100 or permission list synchronizer 426 functions as a trigger to pass out the permission list; and a predetermined length of time passes after the previous permission list was passed out.

Next, if it is determined by permission list updater 425 that a permission list update event was performed (Yes in S51), the processing proceeds to step S52. If it is determined by permission list updater 425 that a permission list update event was not performed (No in S51), the processing proceeds to step S53.

Next, if it is determined by permission list updater 425 that a permission list update event was performed, permission list updater 425 updates the permission list stored in permission list storage 424 (S52). Permission list updater 425 may transmit a request for passing out the permission list to primary dynamic authenticator 300 via communicators 411 and 421. Then, permission list updater 425 stores the permission list acquired from primary dynamic authenticator 300 in permission list storage 424. Through this processing, the permission list stored in permission list updater 425 is the same as the permission list stored in permission list storage 350. Also, the permission list stored in permission list storage 424 may be a portion of the list stored in permission list storage 350 (a portion of the list used by access control determiner 422).

Next, permission list updater 425 determines whether to continue the permission list update processing (S53). If it is determined by permission list updater 425 to continue the update processing (Yes in S53), the processing returns to step S51 and is continued. If it is determined by permission list updater 425 not to continue the update processing (No in S53), the processing ends.

Other Embodiments

The embodiment has been described above as an example of the technique according to the present disclosure. However, the technique according to the present disclosure is not limited thereto, and is also applicable to embodiments obtained by making modifications, replacements, additions, omissions, and the like as appropriate. For example, variations given below are also encompassed in one or more aspects of the embodiment of the present disclosure.

For example, the positions at which anomaly detector 81, monitor 82, and the like according to the embodiment given above are provided are not limited to those shown in FIG. 1, and these structural elements may be provided in, for example, trust zone 70.

Also, in the embodiment given above, an example was described in which the vehicle security apparatus is implemented by central ECU 100. However, the configuration is not limited thereto, and the vehicle security apparatus may be implemented by high-performance computing (HPC).

Also, ECU 801 and ECU 802 (individual ECUs) according to the embodiment given above are capable of transmitting an access request to the zone ECU without passing through the central ECU. When the zone ECU acquires an access request from the individual ECU, the zone ECU may completely prohibit the access request, or permit the access request with a limited function. As used herein, the expression "to completely prohibit the access request" means to determine all access requests from the individual ECU as authentication errors, and not execute the access requests. Also, the expression "to permit the access request with a limited function" means to, for example, make a determination in accordance with the content of the permission list.

Also, the order in which the steps of a flowchart are performed is merely an example to specifically describe the present disclosure. Accordingly, the order may be different from that described above. Also, a portion of the steps may be performed simultaneously (in parallel) with the other steps, or a portion of the steps may not necessarily be performed.

Also, the functional blocks shown in the block diagrams are merely examples. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the structural elements described in the embodiment and the like given above may be implemented as software, or may be typically implemented as LSIs that are integrated circuits. These may be individual single chips, or a part or all of these may be configured in a single chip. Also, the term LSI is used here, but it may be called IC, system LSI, super LSI, or ultra LSI according to the degree of integration. Implementation of an integrated circuit is not limited to an LSI, and may be realized by a dedicated circuit (a general-purpose circuit that executes a dedicated program) or a general-purpose processor. It is also possible to use a field programmable gate array (FPGA) that can be programmed after LSI production or processor a reconfigurable that enables reconfiguration of the connection and setting of circuit cells in the LSI. Furthermore, if a technique for implementing an integrated circuit that can replace LSIs appears by another technique resulting from the progress or derivation of semiconductor technology, the structural element may also be integrated by using that technique.

The system LSI is a super multifunctional LSI manufactured by integrating a plurality of processors on a single chip, and is specifically a computer system that includes a microprocessor, a read only memory (ROM), a random access memory (RAM), and the like. A computer program is stored in the ROM. The functions of the system LSI are implemented as a result of the microprocessor operating in accordance with the computer program.

Also, an aspect of the present disclosure may be a computer program that causes a computer to execute the characteristic steps of any one of the security methods shown in FIGS. 4 to 7.

Also, for example, the program may be a program that causes a computer to execute the security method. Also, an aspect of the present disclosure may be a computer-readable non-transitory recording medium in which the program is recorded. For example, the program may be recorded in the recording medium, and then widely spread or distributed. For example, the widely spread program may be installed on a device that includes a processor. By causing the processor to execute the program, it is possible to cause the device to perform the processing operations described above.

The one or more aspects of the present disclosure also encompass other embodiments obtained by making various modifications that can be conceived by a person having ordinary skill in the art to the above embodiment as well as embodiments implemented by any combination of the structural elements and the functions of the above embodiment without departing from the scope of the one or more aspects of the present disclosure.

(Additional Statements)

The following techniques are disclosed based on the description of the embodiment given above.

(Technique 1)

A vehicle security apparatus mounted in a vehicle, the vehicle including: an electronic control unit (ECU) in which the vehicle security apparatus is provided; and a zone ECU that is controlled by the ECU and controls a device mounted in the vehicle, the vehicle security apparatus including: a primary dynamic authenticator that, when an access request from an access source in the vehicle to an access destination in the vehicle is received, makes a determination as to whether to cause a secondary dynamic authenticator included in the zone ECU connected to the access destination of the access request to execute authorization determination for the access request, based on reliability of an application installed in the access source determined based on at least one of application information regarding the application installed in the access source or a state of the vehicle; and a connection manager that outputs the access request to the zone ECU connected to the access destination when the determination is made to cause the secondary dynamic authenticator that corresponds to the access destination to execute the authorization determination.

With this configuration, the zero trust architecture (ZTA) can be applied to an in-vehicle system (for example, central zone architecture), and the load of the authorization determination can be distributed to the primary dynamic authenticator and the secondary dynamic authenticator while maintaining a secure (safe) state. Accordingly, it is possible to implement a vehicle security apparatus in which the zero trust architecture can be introduced while suppressing the processing concentration and the reduction in security.

It is also possible to cause only the zone ECU to execute the authorization determination. However, it does not fit the concept of the zero trust architecture (ZTA), and thus the security may be reduced. With the configuration described above, which of the primary dynamic authenticator or the secondary dynamic authenticator is caused to execute the authorization determination is determined based on the reliability of the application, and thus the reduction in security can be suppressed.

(Technique 2)

The vehicle security apparatus according to technique 1, wherein the vehicle includes a plurality of zone ECUs, the plurality of zone ECUs include the zone ECU that includes the secondary dynamic authenticator and a zone ECU that does not include the secondary dynamic authenticator, and the primary dynamic authenticator makes the determination further based on authentication information that indicates whether each of the plurality of zone ECUs includes the secondary dynamic authenticator.

With this configuration, the authentication information is used, and it is therefore possible to suppress a situation in which it is determined to cause a zone ECU that does not include the secondary dynamic authenticator to execute the authorization determination (or in other words, access to the requested resource is allowed without performing authorization determination). Accordingly, the reduction in security can be more reliably suppressed.

(Technique 3)

The vehicle security apparatus according to technique 2, wherein the primary dynamic authenticator determines whether the zone ECU connected to the access destination includes the secondary dynamic authenticator, and makes the determination when the zone ECU connected to the access destination includes the secondary dynamic authenticator.

With this configuration, the load of the authorization determination can be distributed to the primary dynamic authenticator and the zone ECU that includes the secondary dynamic authenticator.

(Technique 4)

The vehicle security apparatus according to any one of techniques 1 to 3, wherein the primary dynamic authenticator makes the determination further based on a security state of the vehicle.

With this configuration, the security state of the vehicle is also taken into consideration, and it is therefore possible to distribute the load of the authorization determination at an appropriate timing such as when the security state is good.

(Technique 5)

The vehicle security apparatus according to any one of techniques 1 to 4, including: one or more virtual machines, wherein the reliability is set to a different value based on whether a virtual machine among the one or more virtual machines in which the application of the access source is installed is a virtual machine produced in-house by a manufacturer of the vehicle or a virtual machine prepared externally.

With this configuration, the location in which the application is installed can be reflected to the reliability. It is possible to obtain more accurate reliability.

(Technique 6)

The vehicle security apparatus according to technique 5, wherein the reliability is set to a higher value when the virtual machine is a virtual machine produced in-house than when the virtual machine is a virtual machine prepared externally.

With this configuration, the reliability of an application installed in a virtual machine with a lower security risk can be set to be high.

(Technique 7)

The vehicle security apparatus according to any one of techniques 1 to 6, wherein the reliability is set based on a certificate acquired from the application installed in the access source, the certification including a privilege level of the application.

With this configuration, the certificate given to the application can be reflected to the reliability. It is possible to obtain more accurate reliability.

(Technique 8)

The vehicle security apparatus according to any one of techniques 1 to 7, wherein the reliability is set based on whether an anomaly in the application installed in the access source has been detected.

With this configuration, the anomalous state of the application can be reflected to the reliability. It is possible to obtain more accurate reliability.

(Technique 9)

The vehicle security apparatus according to any one of techniques 1 to 8, wherein the primary dynamic authenticator does not execute the authorization determination for the access request when the determination is made to cause the secondary dynamic authenticator that corresponds to the access destination to execute the authorization determination, and executes the authorization determination for the access request when the determination is made not to cause the secondary dynamic authenticator that corresponds to the access destination to execute the authorization determination.

With this configuration, only either one of the primary dynamic authenticator or the secondary dynamic authenticator performs authorization determination, and it is therefore possible to more reliably distribute the load of the authorization determination.

(Technique 10)

The vehicle security apparatus according to any one of techniques 1 to 9, wherein, when a predetermined condition is satisfied, the primary dynamic authenticator determines to cause each of the primary dynamic authenticator and the secondary dynamic authenticator that corresponds to the access destination to execute the authorization determination.

With this configuration, the authorization determination is performed by each of the primary dynamic authenticator and the secondary dynamic authenticator when the predetermined condition is satisfied. Accordingly, it is possible to improve security.

(Technique 11)

The vehicle security apparatus according to technique 10, wherein the predetermined condition includes at least one of: a condition in which the access request is a request for a first access after updating the reliability; a condition in which a timing is a timing at which each of the primary dynamic authenticator and the secondary dynamic authenticator that corresponds to the access destination executes the authorization determination; or a condition in which an instruction is acquired from outside of the vehicle.

With this configuration, the authorization determination can be executed by each of the primary dynamic authenticator and the secondary dynamic authenticator when the first access is made after updating the reliability, when each of the primary dynamic authenticator and the secondary dynamic authenticator that corresponds to the access destination executes the authorization determination, or when an instruction is acquired from the outside of the vehicle.

(Technique 12)

The vehicle security apparatus according to any one of techniques 1 to 11, wherein the device includes at least one of a terminal accelerator, a sensor, a motor, a battery, or a charger.

With this configuration, it is possible to distribute the load of processing performed for the access request whose access destination is at least one of a terminal accelerator, a sensor, a motor, a battery, or a charger.

(Technique 13)

A security method executed by a vehicle security apparatus mounted in a vehicle, the vehicle including: an electronic control unit (ECU) in which the vehicle security apparatus is provided; and a zone ECU that is controlled by the ECU and controls a device mounted in the vehicle, the security method including: when an access request from an access source in the vehicle to an access destination in the vehicle is received, making a determination as to whether to cause a secondary dynamic authenticator included in the zone ECU connected to the access destination of the access request to execute authorization determination for the access request, based on reliability of an application installed in the access source determined based on at least one of application information regarding the application installed in the access source or a state of the vehicle; and outputting the access request to the zone ECU connected to the access destination when the determination is made to cause the secondary dynamic authenticator that corresponds to the access destination to execute the authorization determination.

With this configuration, the same advantageous effects as those of the vehicle security apparatus described above can be obtained.

(Technique 14)

A non-transitory computer-readable recording medium having recorded thereon a program for causing a computer to execute the above-described security method.

With this configuration, the same advantageous effects as those of the vehicle security apparatus described above can be obtained.

Generic or specific aspects of the present disclosure may be implemented by a system, a method, an integrated circuit, a computer program or a computer readable non-transitory recording medium such as a CD-ROM, or may be implemented by any combination of a system, a method, an integrated circuit, a computer program and a recording medium. The program may be stored in advance in the recording medium, or may be supplied to the recording medium via a wide area communication network such as the Internet.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-146722 filed on Sep. 11, 2023.

INDUSTRIAL APPLICABILITY

The present disclosure is applicable to an in-vehicle network and the like.

The invention claimed is:

1. A vehicle security apparatus mounted in a vehicle, the vehicle including: a central electronic control unit (ECU) in which the vehicle security apparatus is provided; and a zone ECU that is controlled by the central ECU and controls a device mounted in the vehicle, the vehicle security apparatus comprising:
- one or more virtual machines;
- a first processor; and
- a memory including a program that, when executed by the first processor, causes the first processor to:
  - when an access request from an access source in the vehicle to an access destination in the vehicle is received, make a determination as to whether to cause a second processor included in the zone ECU connected to the access destination of the access request to execute authorization determination for the access request, based on reliability of an application installed in the access source and determined based on at least one of application information regarding the application installed in the access source or a state of the vehicle; and
  - output the access request to the zone ECU connected to the access destination when the determination is made to cause the second processor that corresponds to the access destination to execute the authorization determination,
- wherein the reliability is set to a different value based on whether a virtual machine among the one or more virtual machines in which the application of the access source is installed is produced in-house by a manufacturer of the vehicle or prepared externally.

2. The vehicle security apparatus according to claim 1,
- wherein the vehicle includes a plurality of zone ECUs,
- the plurality of zone ECUs includes the zone ECU that includes the second processor and a second zone ECU that does not include the second processor, and
- the first processor makes the determination further based on authentication information that indicates whether each of the plurality of zone ECUs includes the second processor.

3. The vehicle security apparatus according to claim 2,
- wherein the first processor determines whether the zone ECU connected to the access destination includes the second processor, and makes the determination when the zone ECU connected to the access destination includes the second processor.

4. The vehicle security apparatus according to claim 1, wherein the first processor makes the determination further based on a security state of the vehicle.

5. The vehicle security apparatus according to claim 1, wherein the reliability is set to a higher value when the virtual machine is produced in-house than when the virtual machine is prepared externally.

6. The vehicle security apparatus according to claim 1, wherein the reliability is further set based on a certificate acquired from the application installed in the access source, the certificate including a privilege level of the application.

7. The vehicle security apparatus according to claim 1, wherein the reliability is further set based on whether an anomaly in the application installed in the access source has been detected.

8. The vehicle security apparatus according to claim 1, wherein the first processor does not execute the authorization determination for the access request when the determination is made to cause the second processor that corresponds to the access destination to execute the authorization determination, and executes the authorization determination for the access request when the determination is made not to cause the second processor that corresponds to the access destination to execute the authorization determination.

9. The vehicle security apparatus according to claim 1, wherein, when a predetermined condition is satisfied, the first processor determines to cause each of the first processor and the second processor that corresponds to the access destination to execute the authorization determination.

10. The vehicle security apparatus according to claim 9, wherein the predetermined condition includes at least one of:

a first condition in which the access request is for a first access after updating the reliability;

a second condition in which a timing is at which each of the first processor and the second processor that corresponds to the access destination executes the authorization determination; or a third condition in which an instruction is acquired from outside of the vehicle.

11. The vehicle security apparatus according to claim 1, wherein the device includes at least one of a terminal accelerator, a sensor, a motor, a battery, or a charger.

12. The vehicle security apparatus according to claim 1, wherein the application information includes at least one of an anomaly in the application, in the virtual machine in which the application is installed, in first anomaly detector that monitors the application, or in a second anomaly detector that monitors the virtual machine in which the application is installed.

13. The vehicle security apparatus according to claim 1, wherein the state of the vehicle includes at least one of a running location of the vehicle, usage of the access destination, a running state of the vehicle, a first security condition of the access source, a second security condition of the access destination, or usage of a service used in the vehicle.

14. The vehicle security apparatus according to claim 1, wherein the application information is based on at least one of a location of the application or a privilege level of the application.

15. The vehicle security apparatus according to claim 1, wherein the first processor includes a primary processor and a secondary processor, the primary processor is provided in a trusted region included in the central ECU, and the secondary processor is provided in a non-trusted region included in the central ECU.

16. The vehicle security apparatus according to claim 1, wherein the second processor is provided in a trusted region included in the zone ECU.

17. The vehicle security apparatus according to claim 2, wherein the first processor is provided in a trusted region included in the central ECU, and includes a storage that stores the authentication information.

18. A security method executed by a vehicle security apparatus mounted in a vehicle, the vehicle including: a central electronic control unit (ECU) in which the vehicle security apparatus is provided; and a zone ECU that is controlled by the central ECU and controls a device mounted in the vehicle, the security method comprising:

when an access request from an access source in the vehicle to an access destination in the vehicle is received, making, by a first processor, a determination as to whether to cause a second processor included in the zone ECU connected to the access destination of the access request to execute authorization determination for the access request, based on reliability of an application installed in the access source and determined based on at least one of application information regarding the application installed in the access source or a state of the vehicle; and outputting the access request to the zone ECU connected to the access destination when the determination is made to cause the second processor that corresponds to the access destination to execute the authorization determination, wherein the reliability is set to a different value based on whether a virtual machine in which the application of the access source is installed is produced in-house by a manufacturer of the vehicle or prepared externally.

19. A non-transitory computer-readable recording medium having recorded thereon a program for causing a computer to execute the security method according to claim 18.

* * * * *